United States Patent
Cai et al.

(10) Patent No.: US 9,450,781 B2
(45) Date of Patent: Sep. 20, 2016

(54) SPAM REPORTING AND MANAGEMENT IN A COMMUNICATION NETWORK

(75) Inventors: Yigang Cai, Naperville, IL (US); Gyan Shanker, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 808 days.

(21) Appl. No.: 12/964,600

(22) Filed: Dec. 9, 2010

(65) Prior Publication Data

US 2012/0150967 A1 Jun. 14, 2012

(51) Int. Cl.
G06F 15/16 (2006.01)
H04L 12/58 (2006.01)
H04L 29/08 (2006.01)
H04L 29/06 (2006.01)

(52) U.S. Cl.
CPC ............ *H04L 12/585* (2013.01); *H04L 12/58* (2013.01); *H04L 29/08702* (2013.01); *H04L 51/12* (2013.01); *H04L 63/10* (2013.01)

(58) Field of Classification Search
CPC . H04L 51/12; H04L 12/58; H04L 29/08702; H04L 63/10
USPC .......................................................... 709/206
See application file for complete search history.

(56) References Cited

U.S. PATENT DOCUMENTS

| | | | |
|---|---|---|---|
| 7,610,342 B1 * | 10/2009 | Pettigrew et al. | 709/206 |
| 7,647,376 B1 * | 1/2010 | Jagger et al. | 709/206 |
| 7,698,370 B1 * | 4/2010 | Hall | 709/206 |
| 8,200,552 B2 | 6/2012 | Swanson | |
| 8,204,930 B1 * | 6/2012 | Kee et al. | 709/203 |
| 8,396,927 B2 | 3/2013 | Cai | |
| 8,856,165 B1 * | 10/2014 | Cierniak | G06Q 10/10 705/28 |
| 2003/0108015 A1 * | 6/2003 | Li | 370/338 |
| 2005/0044206 A1 * | 2/2005 | Johansson et al. | 709/224 |
| 2005/0188091 A1 | 8/2005 | Szabo et al. | |
| 2006/0104423 A1 * | 5/2006 | Heidloff et al. | 379/88.12 |
| 2006/0168030 A1 * | 7/2006 | Cai et al. | 709/206 |

(Continued)

FOREIGN PATENT DOCUMENTS

CN 101180629 5/2008
WO WO2005001733 A1 1/2005

OTHER PUBLICATIONS

J.D. Falk; Mail Abuse Reporting Format (MARF) History & Overview; Oct. 14, 2015; 29 pages; retrieved from https://www.ietf.org/proceedings/77/slides/marf-0.pdf.*

(Continued)

*Primary Examiner* — Oleg Survillo
(74) *Attorney, Agent, or Firm* — Duft Bornsen & Fettig, LLP

(57) ABSTRACT

Systems and methods are disclosed for reporting spam detected in a communication network. Entities in the network detect that an electronic message comprises spam, and generate a spam report for the electronic message. The spam report is in a format that is enhanced with newly-defined fields. A spam center in the network receives the spam reports from the entities, and processes the spam reports to generate spam rules for detecting spam in electronic messages transported over the communication network. The spam center then selectively distributes the spam rules to one or more of the entities of the communication network based on an analysis of the spam reports. The entities may then use the spam rules to detect spam in other electronic messages that are transported over the communication network.

17 Claims, 4 Drawing Sheets

(56) References Cited

U.S. PATENT DOCUMENTS

| | | | |
|---|---|---|---|
| 2006/0168035 A1* | 7/2006 | Cai et al. | 709/206 |
| 2006/0195912 A1* | 8/2006 | Dew et al. | 726/27 |
| 2006/0256012 A1 | 11/2006 | Fok et al. | |
| 2007/0156898 A1 | 7/2007 | Appleby et al. | |
| 2007/0224971 A1 | 9/2007 | Jung et al. | |
| 2008/0034069 A1* | 2/2008 | Schofield et al. | 709/220 |
| 2008/0077971 A1* | 3/2008 | Wright et al. | 726/1 |
| 2008/0102799 A1 | 5/2008 | Dholakia et al. | |
| 2008/0126221 A1 | 5/2008 | Swanson | |
| 2008/0250267 A1* | 10/2008 | Brown et al. | 714/4 |
| 2009/0063371 A1* | 3/2009 | Lin | 706/10 |
| 2009/0077617 A1* | 3/2009 | Levow et al. | 726/1 |
| 2009/0164582 A1* | 6/2009 | Dasgupta | G06Q 10/00 709/205 |
| 2009/0210477 A1* | 8/2009 | White et al. | 709/202 |
| 2009/0219946 A1 | 9/2009 | Liu et al. | |
| 2010/0094943 A1* | 4/2010 | Leuca | G06Q 10/107 709/206 |
| 2010/0212011 A1* | 8/2010 | Rybak | H04L 12/585 726/22 |
| 2010/0229236 A1* | 9/2010 | Rybak | H04L 12/585 726/22 |
| 2011/0055343 A1* | 3/2011 | Gleeson et al. | 709/206 |
| 2011/0161425 A1 | 6/2011 | Xiao | |
| 2011/0191847 A1* | 8/2011 | Davis et al. | 726/22 |
| 2012/0084243 A1* | 4/2012 | Slavitch et al. | 706/47 |
| 2012/0096046 A1 | 4/2012 | Kucera | |
| 2012/0120887 A1* | 5/2012 | Deaton et al. | 370/329 |
| 2012/0185550 A1* | 7/2012 | Hart | 709/206 |
| 2012/0215862 A1* | 8/2012 | Cai et al. | 709/206 |
| 2012/0284795 A1* | 11/2012 | Durie | 726/23 |
| 2013/0018707 A1* | 1/2013 | Agarwal et al. | 705/14.1 |

OTHER PUBLICATIONS

Complaint Feedback Loop Best Current Practices; Apr. 2010; Messaging Anti-Abuse Working Group (MAAWG); 20 pages; retrieved from http://www.internetsociety.org/sites/default/files/MAAWG_Complaint_Feedback_Loop_BCP_2010-08_0.pdf.*

Y. Shafranovich; An Extensibile Format for Email Feedback Reports; May 2007; Network Working Group; 14 pages; retrieved from http://mipassoc.org/arf/specs/draft-shafranovich-feedback-report-02.html.*

Cai et al; Anti-spam Policy Instruction/Distribution Operation Draft-CAI-Marf-Policy-Instruction-Operation.txt, Internet Engineering Task Force, IETF; STANDARDWORKINGDRAFT, Internet Society (ISOC) 4, Rue Des Falaises CH-1205 Geneva Swizerland, 20101-11-23 pp. 1-26 XP15071078.

* cited by examiner

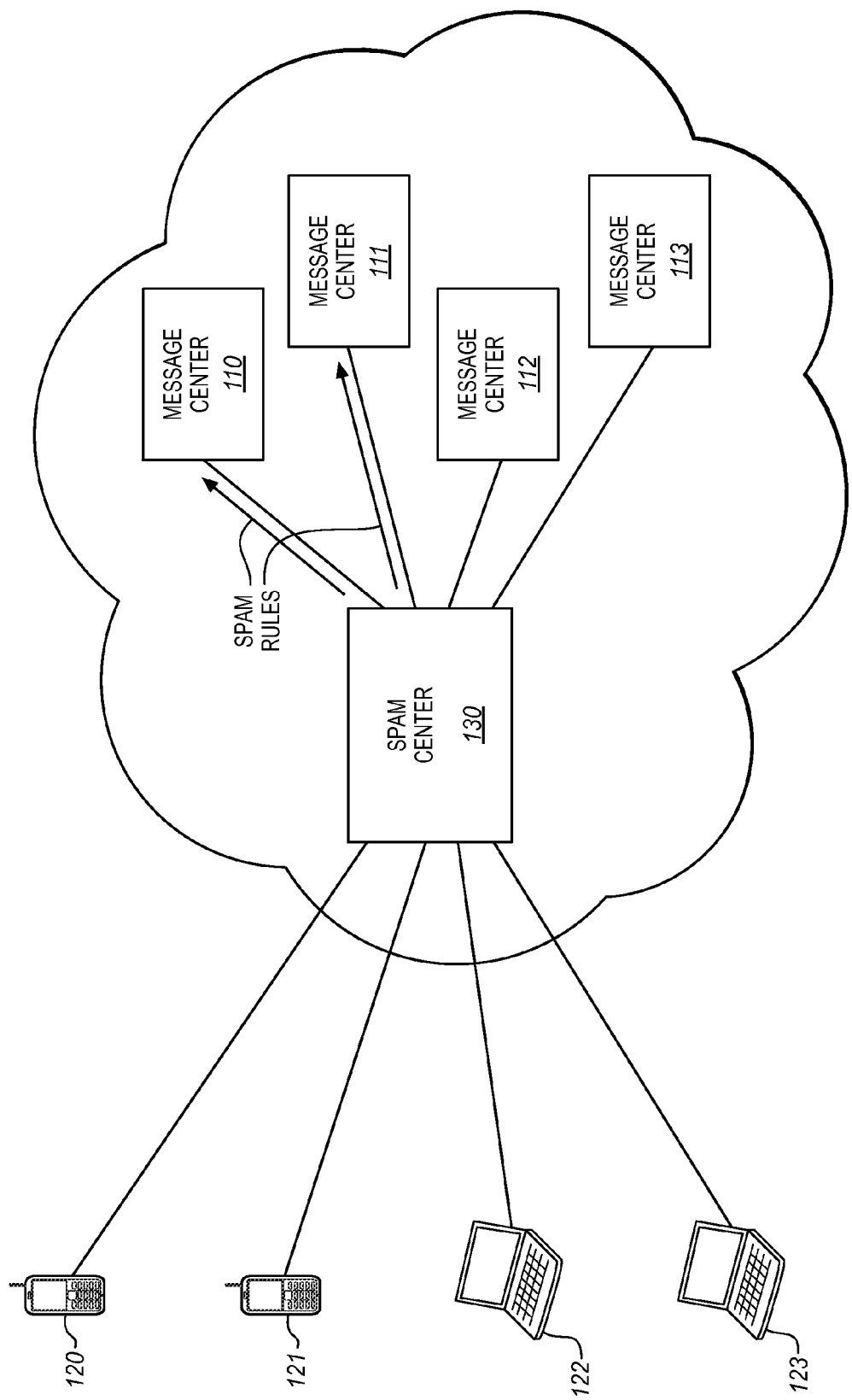

SPAM REPORTING AND MANAGEMENT IN A COMMUNICATION NETWORK

FIELD OF THE INVENTION

The invention is related to the field of communications, and more particularly, to reporting spam detected in a communication network.

BACKGROUND

Almost every user of an electronic messaging technology has encountered spam messages. Spam is the use of electronic messaging systems to send unsolicited messages indiscriminately to multiple end users. The most widely recognized form of spam is email spam, but the term is applied to instant messaging (IM), SMS, MMS, social networking, and other types of messaging.

Some communication networks have a centralized spam agent that tracks spam messages that are transported in the network. End user devices and network nodes (e.g., an email server, SMSC, MMSC) may be programmed to report spam messages to the centralized spam agent. Standards bodies have defined formats for the spam reports. For example, the Internet Engineering Task Force (IETF) has defined a Message Abuse Reporting Format (MARF) for reporting spam to the centralized agent. Similarly, Open Mobile Alliance (OMA) has suggested a format for reporting spam ("Mobile Spam Reporting Technical Specification"; OMA-TS-Spam-Rep-V1_0-20100601-D).

Unfortunately, present reporting standards for spam are insufficient, and the centralized agent does not adequately protect the network from spam.

SUMMARY

Embodiments described herein provide improved reporting of spam to a centralized spam center. A reporting format as described herein includes enhanced fields for spam information, such as message protocol, abuse type, abuse detection method, abuse keyword(s), abuse multimedia element, delivery decision, and timestamps. These additional fields provide the spam center with more information about the spam messages and how they were detected. The spam center processes the spam reports (with the enhanced reporting format) to generate spam rules that are used to filter electronic messages that are transported over the network. The spam center then distributes the spam rules to message centers within the network. The spam rules sent to the message centers are more effective for spam filtering because the spam center had more and better information to use in generating the spam rules. Thus, spam should be less of a problem within the network.

One embodiment comprises an entity in a communication network that handles electronic messages transported over the communication network, such as an end user device or a message center. In handling the electronic messages, the entity is operable to detect that an electronic message comprises spam. This means that the entity has either identified the message as spam or has identified the message is suspected of being spam. In response to determining that the electronic message comprises spam, the entity is further operable to generate a spam report for the electronic message, and to transmit the spam report to a spam center. The spam report is in a format that is enhanced with one or more of the following fields: message type, abuse type, abuse detection method, abuse keyword, abuse multimedia elements, and message delivery decision.

Another embodiment comprises the spam center in the communication network. The spam center is operable to receive the spam reports from the entities of the communication network, and to process the spam reports to generate spam rules for filtering electronic messages transported over the communication network. The spam center is further operable to selectively distribute the spam rules to one or more of the entities of the communication network based on an analysis of the spam reports. The entities may then use the spam rules to detect spam in other electronic messages that are transported over the communication network.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

FIG. 5 illustrates a spam center distributing spam rules to entities in an exemplary embodiment.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
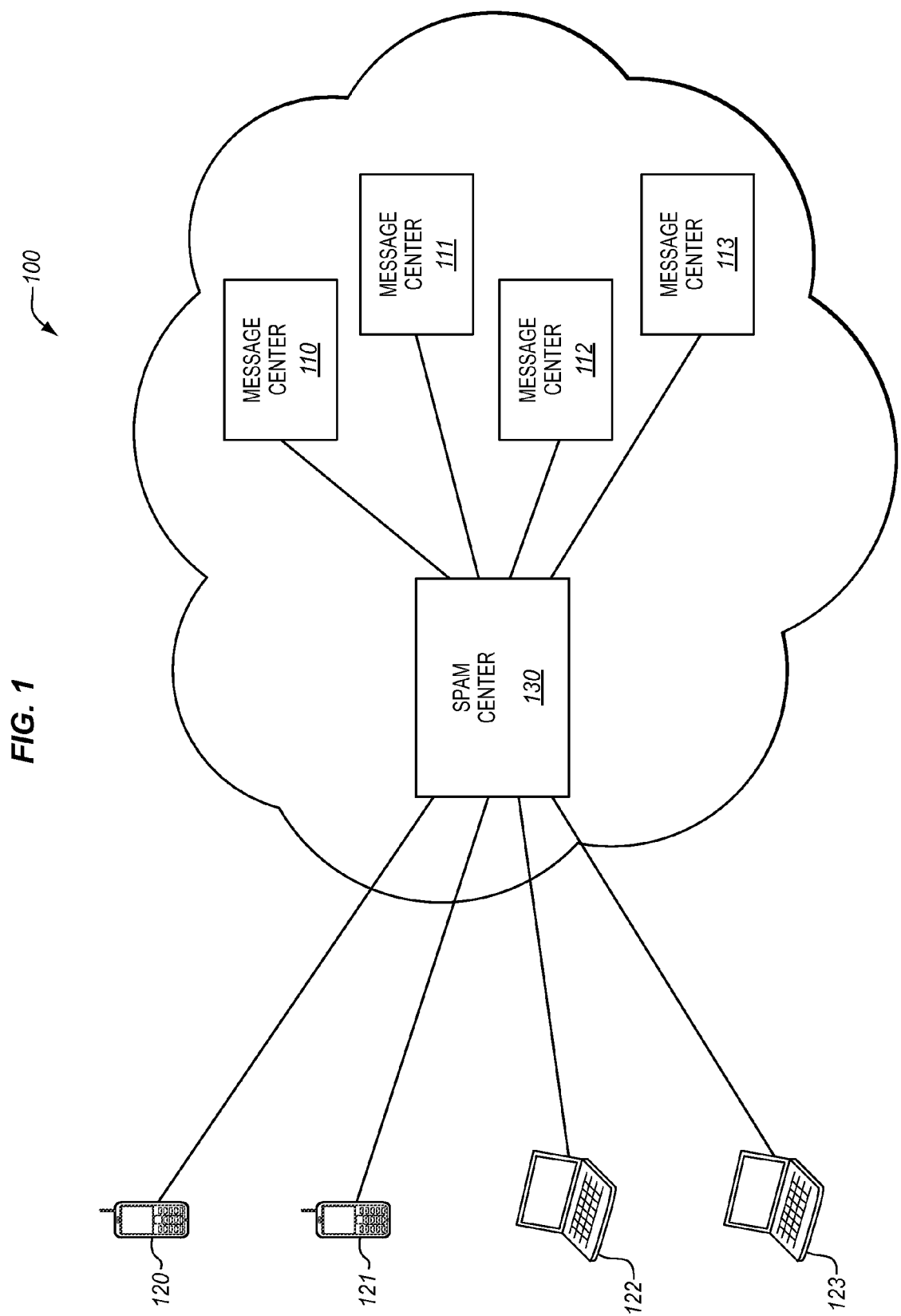
FIG. 1 illustrates a communication network in an exemplary embodiment.

FIG. 1 illustrates a communication network 100 in an exemplary embodiment. Communication network 100 comprises a packet-switched network that is operable to transport electronic messages. Electronic messages comprise any type of digital message that is exchanged over a network. Some examples of an electronic message are emails, Short Message Service (SMS) messages, Multimedia Message Service (MMS) messages, Instant Messages (IM), etc. In this embodiment, communication network 100 includes a plurality of message centers 110-113. A message center 110-113 comprises any server, router, or other system operable to handle electronic messages. Some examples of a message center 110-113 are a Short Message Service Center (SMSC), a Multimedia Message Service Center (MMSC), an email server, and an Instant Messaging gateway (IM GW). Communication network 100 may include multiple other servers, routers, and other network elements.

Communication network 100 also provides service to a plurality of end user devices, referred to generally as user agents 120-123. User agents 120-123 comprise any devices (wireline or wireless) operated by end users to send or receive electronic messages. For example, a user agent 120-123 may comprise a phone or other device having an SMS application, an MMS application, or an IM application. A user agent 120-123 may also comprise a phone, a PC, a laptop, etc., having an email application. Message centers 110-113 and user agents 120-123 are referred to generally herein as "entities".

Communication network 100 in FIG. 1 also includes a spam center 130. Spam center 130 comprises any system or server that receives spam reports from entities, and generates spam criteria, rules, algorithms, etc., (referred to herein as "spam rules") for detecting spam in electronic messages. For example, the spam rules may indicate which electronic messages comprise spam, such as by an originating/terminating address for the message, an originating/terminating domain for the message, etc. The spam rules may also indicate how to filter electronic messages that comprise spam, such as block the message, deliver the message, hold the message, etc.

Figure 2:
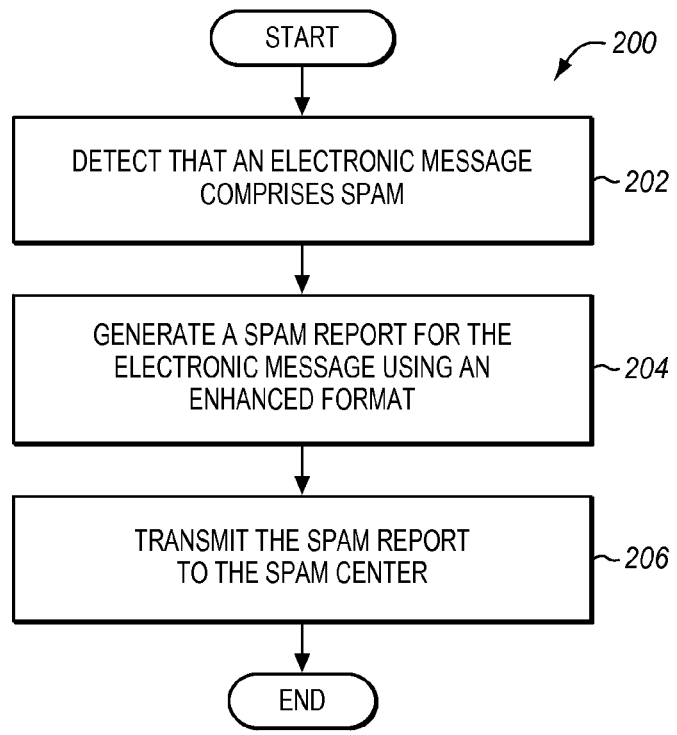
FIG. 2 is a flow chart illustrating a method of reporting spam in an exemplary embodiment.

When in operation, user agents 120-123 transmit and receive electronic messages over communication network 100. Message centers 110-113 handle these electronic messages that are exchanged over communication network 100. As part of handling the electronic messages, message centers 110-113 and/or user agents 120-123 may process the spam rules that are generated by spam center 130 to detect electronic messages that are identified or suspected of comprising spam. Message centers 110-113 and user agents 120-123 are able to report any identified or suspicious electronic messages to spam center 130 in a spam report. FIG. 2 further illustrates how user agents 120-123 and/or message centers 110-113 report to spam center 130.

FIG. 2 is a flow chart illustrating a method 200 of reporting spam in an exemplary embodiment. The steps of method 200 will be described with reference to network 100 in FIG. 1, but those skilled in the art will appreciate that method 200 may be performed in other networks and systems. The steps of the flow charts described herein are not all inclusive and may include other steps not shown. The steps may also be performed in an alternative order.

In step 202, an entity (e.g., message centers 110-113 and/or user agents 120-123) in network 100 detects that an electronic message comprises spam. This means that the entity has either identified the message as spam or has identified the message is suspected of being spam. The entity may make this determination based on rules and/or policies that are distributed by spam center 130 (this is further described in FIG. 3). In response to detecting that the electronic message comprises spam, the entity generates a spam report for the electronic message in step 204. The spam report includes characteristics about the electronic message, and characteristics about how the entity determined that the electronic message comprises spam. For example, the spam report may indicate where the electronic message came from, where the electronic message was being sent, the content of the electronic message (e.g., keywords), what rules are violated by the electronic message, etc. In step 206, the entity transmits the spam report to spam center 130.

There are standardized formats for the spam reports which define the fields that are included in the report. For example, the Internet Engineering Task Force (IETF) and the Open Mobile Alliance (OMA) have each defined standards for spam reporting. In this embodiment, a spam report sent by an entity to spam center 130 is enhanced to include newly-defined fields. According to the enhancements, a report for an electronic message that comprises spam includes one or more of the following newly-defined fields:

(1) Message ID. The Message ID field is of type "Integer", and indicates the unique identifier for the electronic message. A message ID may be found in the electronic message itself for an incoming message, or may be created by a message center for an outgoing message.

(2) Message Center ID. The Message Center ID field is of type "Integer", and indicates the unique identifier for a message center which sent the spam report.

(3) Message Type. The Message Type field is of type "Enumerated", and indicates the type of electronic message. Examples of a type of electronic message include email, SMS, MMS, and IM.

(4) Message Protocol ID. The Message Protocol ID field is of type "Enumerated", and indicates the message protocol used by a message center for transporting the electronic message. Examples of a message protocol are: SMTP, SMPP, 3GPP MAP, 3GPP SIP, 3GPP2 SIP, and ANSI SMDPP.

(5) Message Teleservice ID. The Message Teleservice ID field is of type "String", and indicates the message teleservice identifier or service type. For example, in SMS, the teleservice ID could be WPT (Wireless Paging Teleservice), WMT (Wireless Messaging Teleservice), VMN (Voicemail Notification), WAP, WEMT (Wireless Enhanced Messaging Teleservice), etc.

(6) Message Language Indicator. The Message Language Indicator field is of type "Integer", and indicates the language used in the electronic message. Examples of the language are English, French, Spanish, Italian, etc.

(7) Message Segment Indicator. The Message Segment Indicator field is of type "Integer", and indicates the message segment(s) that are identified as spam. When an electronic message exceeds a length defined in the protocol (e.g., 160 characters in SMS), an entity sending the electronic message may break down the whole electronic message into multiple segments. Each segment is within the allowed length of the protocol. The entity indicates the sequence of segments so that the receiving entity may re-assemble the whole electronic message together and display as one message. For spam detection, one of segments may be identified as a spam, while the rest segments are not. This field indicates which message segment or segments is identified as spam.

(8) Message Data Encoding. The Message Data Encoding field is of type "String", and indicates the user data encoding schemes used in the electronic message. There are many different data encoding schemes used for electronic message. For example, SMS has ASCII, GSM default alphabet, Octet Unspecified, USC (UNICODE), etc.

(9) Message User Data. The Message User Data field is of type "UTF8String", and includes the user data (payload content) or a subset of the user data from the original electronic message.

(10) Originating Domain. The Originating Domain field is of type "String", and indicates the domain name of the originating network for the electronic message.

(11) Originating Address Type. The Originating Address Type field is of type "Enumerated", and indicates the address type for the originator of the electronic message. Examples of the address type include an IP address, a mobile number (MSISDN, IMSI), an email address, etc.

(12) Originating Address. The Originating Address field is of type "String", and indicates the address for the originator of the electronic message.

(13) Terminating Domain. The Terminating Domain field is of type "String", and indicates the domain name of the terminating network for the electronic message.

(14) Termination Address Type. The Terminating Address Type field is of type "Enumerated", and indicates the address type for the destination/recipient of the electronic message.

(15) Termination Address. The Terminating Address field is of type "String", and indicates the address for the destination/recipient of the electronic message.

(16) Abuse Type. The Abuse Type field is of type "Enumerated", and indicates the type of abuse found or suspected for the electronic message. Examples of abuse type include spam (or not spam), phishing, spoofing, fake sender address, unauthorized sender/recipient, suspicious network/domain, message flooding, denial of service attack, malware (e.g., virus/spyware), and unauthorized message (violation of a security policy).

(17) Abuse Detected Method. The Abuse Detected Method field is of type "Enumerated", and indicates how the abuse was detected by the entity for the electronic message. Examples of how to detect abuse include white/black list, forbidden network domain/address screening, forbidden application entity screening, spam keywords match, spam multimedia match, spam pattern match, volume threshold per sender match, and volume threshold per sending network/domain match.

(18) Abuse Keyword. The Abuse Keyword field is of type "String", and indicates the keywords detected by an entity for the electronic message. The content of this field may be a single word, multiple words, a phrase, a short sentence, etc.

(19) Abuse Multimedia Element. The Abuse Multimedia Element field is of type "UTF8String", and indicates the abuse multimedia element detected by a message center. Some messaging protocols allow for multimedia elements to be embedded in the message, such as music melody, ring tones, pictures, animation, etc. This field indicates the multimedia element detected in the message.

(20) Message Delivery Decision. The Message Delivery Decision field is of type "Enumerated", and indicates how a message center filtered the electronic message (if applicable). Examples of a delivery decision include delivered, rejected with notification, dropped silently, and on hold for instruction.

(21) Message Received Timestamp. The Message Received Timestamp field is of type "Time", and indicates the time in which the electronic message was received or created at an entity.

(22) Message Delivered Timestamp. The Message Delivered Timestamp field is of type "Time", and indicates the time in which the electronic message was delivered to an entity.

(23) Message Blocked Timestamp. The Message Blocked Timestamp field is of type "Time", and indicates the time in which the electronic message was rejected or dropped silently at the message center.

As entities in network 100 handle electronic messages over a period of time, many entities may provide spam reports to spam center 130 using the enhanced format. Spam center 130 may then process the spam reports to generate new spam rules/policies for network 100.

Figure 3:
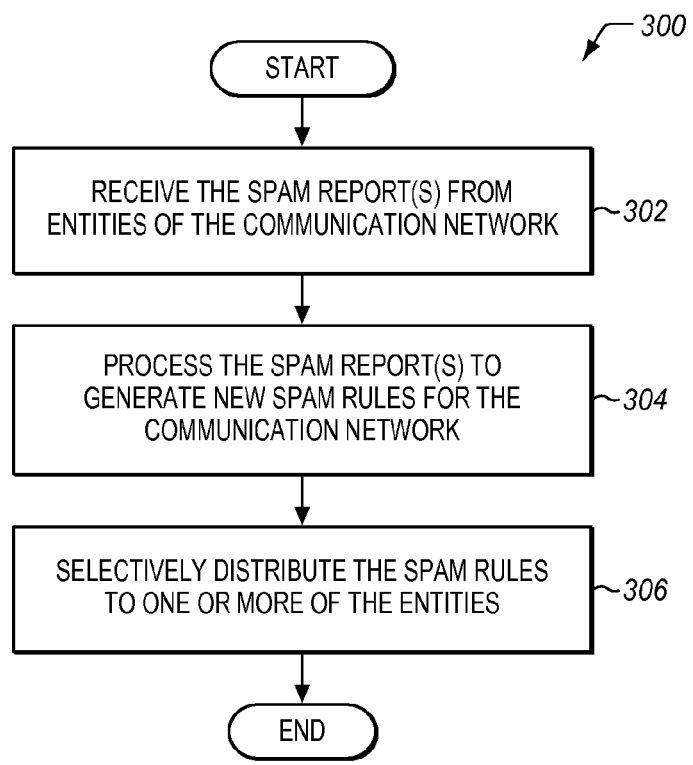
FIG. 3 is a flow chart illustrating a method of generating spam rules in an exemplary embodiment.

FIG. 3 is a flow chart illustrating a method 300 of generating spam rules in an exemplary embodiment. The steps of method 300 will be described with reference to spam center 130 in FIG. 1, but those skilled in the art will appreciate that method 300 may be performed in other networks and systems.

Figure 4:
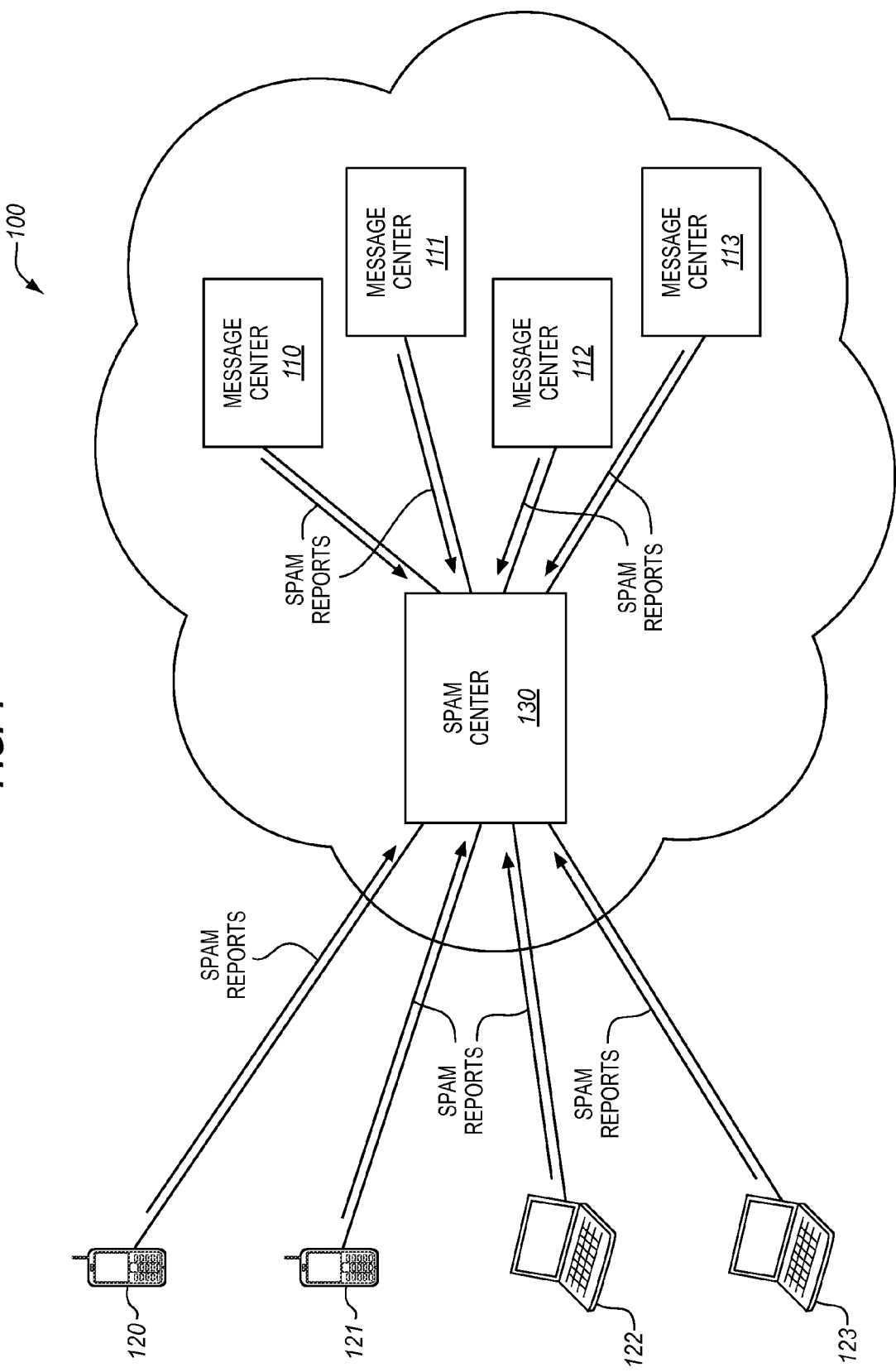
FIG. 4 illustrates a spam center receiving spam reports from entities in an exemplary embodiment.

In step 302, spam center 130 receives the spam report(s) from one or more entities (e.g., message centers 110-113 and user agents 120-123) of network 100. FIG. 4 illustrates spam center 130 receiving spam reports from entities in an exemplary embodiment. Again, the spam reports are in the enhanced format described above. In step 304, spam center 130 processes, compiles, and/or analyzes the spam report(s) from the entities of network 100 to generate new spam rules (also referred to as a new spam policy) for communication network 100. The spam rules are used to instruct entities how to identify spam and/or how to filter electronic messages that comprise spam. For example, the spam rules may indicate a source of a spam message (e.g., an originating address/originating domain), a message protocol for a spam message, a keyword(s) for a spam message, etc. The spam rules may further indicate a filtering time window that defines a time period that the spam rules are valid.

In step 306, spam center 130 selectively distributes the spam rules to one or more of the entities. FIG. 5 illustrates spam center 130 distributing spam rules to entities in an exemplary embodiment. In the example shown in FIG. 5, spam center 130 sends the spam rules to message centers 110-111. However, spam center 130 may send the spam rules to multiple other entities in other embodiments.

In order to "selectively" distribute the spam rules to the entities, spam center 130 analyses the spam reports received from the entities. The analysis includes processing one or more of the fields of the reports to determine which entities are applicable to the new spam rules. When the applicable entities are identified based on the spam report they submitted, spam center 130 may selectively distribute the spam rules to these applicable entities. The applicability of a particular entity may depend on the spam rules that were generated. For example, if the spam rules apply to SMS, then spam center 130 may determine that only SMSCs are applicable. If the spam rules apply to multimedia content, then spam center 130 may determine that only MMSCs and email servers are applicable. Regardless, spam center 130 uses the information submitted in the spam reports from the entities to determine where to distribute spam rules that is generates.

In one embodiment, spam center 130 may distribute the new spam rules based on message type. To do so, spam center 130 may analyze the message type (and possibly the protocol ID) in the spam report(s), and identify the entities that handle electronic messages of this particular message type. For instance, if the message type is SMS, then spam center 130 may identify the entities in network 100 that handle SMS messages. Spam center 130 may then selectively distribute the spam rules to the entities identified for handling this particular type of message. The spam rules may also be distributed to entities of different message types. For example, if a spam email is identified with a forbidden foreign network domain, then spam center 130 may generate spam rules for this foreign network domain, and distribute the spam rules to SMSCs and MMSCs in communication network 100 in addition to email servers in communication network 100.

In another embodiment, spam center 130 may additionally or alternatively distribute the new spam rules based on an abuse type. For example, spam center 130 may analyze the abuse type (and possibly the protocol ID) in the spam report(s), and identify the entities that detected a particular abuse type or are susceptible of this particular abuse type. Spam center 130 may then selectively distribute the spam rules to these identified entities.

In another embodiment, spam center 130 may additionally or alternatively distribute the new spam rules based on a particular originating address/domain. For example, spam center 130 may analyze the originating address and/or originating domain in the spam report(s), and identify the entities that handle electronic messages from this originating address/domain. For instance, if the originating domain is a foreign domain, then spam center 130 may identify the entities in network 100 that potentially receive electronic messages from this foreign domain. Spam center 130 may then selectively distribute the spam rules to these identified entities.

There may be many other factors that contribute to the decision of where to distribute a new set of spam rules, such as language, abuse detected method, terminating domain, etc. Virtually any of the new fields in the spam reports may be used alone or in combination in the decision of where to distribute the new set of spam rules. Spam center 130 may also distribute the new spam rules to each of the entities in communication network 100, if it determines the new spam rules are useful to each of the entities in preventing spam attacks. Thus, the new spam rules would be broadcast network-wide.

When an entity, such as message center 110, receives the new spam rules from spam center 130, it processes the new spam rules when handling electronic messages to detect spam. If message center 110 detects spam based on the new spam rules, then message center 110 again generates a spam report using the format described above. Message center 110 may also indicate the spam rules that were used in detecting the spam message, such as by a rules or policy ID. Each of the entities that receive the new spam rules operates in a similar fashion to report spam to spam center 130. The process then repeats with spam center 130 generating new spam rules based on the new report(s).

One advantage in the above embodiments is that the new format for the spam reports provides much more information about a spam message. Spam center 130 is able to use the additional information in defining the new spam rules and in selectively distributing the new spam rules to the entities. This allows the entities to most effectively detect spam in the electronic messages that are transported over network 100, and filtering the spam accordingly.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. A method performed in a spam center of a communication network, the method comprising:

receiving spam reports in the spam center from entities of the communication network that detect spam in electronic messages transported over the communication network;

wherein spam reports are each formatted with report fields comprising: an abuse type field indicating a type of abuse found in an electronic message, an abuse detected method field indicating a screening method used by an entity for detecting the abuse for the electronic message, an abuse keyword field indicating keywords detected by the entity in the electronic message, and a message delivery decision field indicating how the entity filtered the electronic message;

processing the spam reports in the spam center;

generating new spam rules for detecting spam in electronic messages transported over the communication network;

analyzing the report fields of the spam reports to identify at least one of the entities that detected a particular abuse keyword indicated in the abuse keyword field, rendering the at least one of the entities applicable to the new spam rules; and selectively distributing the new spam rules from the spam center to the identified one or more entities based on the analysis of the report fields in the spam reports.

2. The method of claim 1 wherein:

the spam reports from the entities are further formatted with an abuse multimedia element field indicating whether a multimedia element is detected in the electronic message by the entity as associated with the abuse.

3. The method of claim 1 wherein selectively distributing the new spam rules comprises:

identifying entities that handle electronic messages of a particular message type based on the spam reports; and selectively distributing the new spam rules from the spam center to the identified entities based on the message type.

4. The method of claim 3 wherein the message type includes one of: email, Short Message Service (SMS), Multimedia Message Service (MMS), and Instant Messaging.

5. The method of claim 1 wherein selectively distributing the new spam rules comprises:

identifying entities that handle electronic messages from a particular originating address/domain based on the spam reports; and selectively distributing the new spam rules from the spam center to the identified entities based on the originating address/domain.

6. The method of claim 1 wherein:

the new spam rules indicate a time period during which the new spam rules are valid.

7. A system comprising:

a spam center of a communication network, the spam center having a computer processor configured to receive spam reports from entities of the communication network that detect spam in electronic messages transported over the communication network;

wherein the spam reports are each formatted with report fields comprising: an abuse type field indicating a type of abuse found in an electronic message, an abuse detected method field indicating a screening method used by an entity for detecting the abuse for the electronic message, an abuse keyword field indicating keywords detected by the entity in the electronic message, and a message delivery decision field indicating how the entity filtered the electronic message;

the spam center is further configured to:
- process the spam reports,
- generate new spam rules for detecting spam in electronic messages transported over the communication network,
- analyze the report fields in the spam reports to identify at least one of the entities that detected a particular abuse keyword indicated in the abuse keyword field, rendering the at least one of the entities applicable to the new spam rules, and
- selectively distribute the new spam rules to the identified one or more entities based on the analysis of the report fields in the spam reports.

8. The system of claim 7 wherein:
the spam reports from the entities are further formatted with an abuse multimedia element field indicating whether a multimedia element is detected in the electronic message by the entity as associated with the abuse.

9. The system of claim 7 wherein:
the spam center is further configured to identify entities that handle electronic messages of a particular message type based on the spam reports, and to selectively distribute the new spam rules to the identified entities based on the message type.

10. The system of claim 9 wherein the message type includes one of: email, Short Message Service (SMS), Multimedia Message Service (MMS), and Instant Messaging.

11. The system of claim 7 wherein:
the spam center is further configured to identify entities that handle electronic messages from a particular originating address/domain based on the spam reports, and to selectively distribute the new spam rules to the identified entities based on the originating address/domain.

12. The system of claim 7 wherein:
the new spam rules indicate a time period during which the new spam rules are valid.

13. A network comprising:

a plurality of entities that detect spam in electronic messages transported over the network, and generate spam reports for the electronic messages;

wherein each entity generates a spam report that is formatted with report fields comprising: an abuse type field indicating a type of abuse found in an electronic message, an abuse detected method field indicating a screening method used by the entity for detecting the abuse for the electronic message, an abuse keyword field indicating keywords detected by the entity in the electronic message, and a message delivery decision field indicating how the entity filtered the electronic message; and a spam center having a computer processor that:
- receives the spam reports from the plurality of entities,
- processes the spam reports,
- generates new spam rules for detecting spam in electronic messages transported over the network,
- analyzes the report fields of the spam reports to identify at least one of the entities that detected a particular abuse keyword indicated in the abuse keyword field, rendering the at least one of the entities applicable to the new spam rules, and
- selectively distributes the new spam rules to the identified one or more entities based on the analysis of the report fields in the spam reports.

14. The network of claim 13 wherein:
the spam center identifies entities that handle electronic messages of a particular message type based on the spam reports, and selectively distributes the new spam rules to the identified entities based on the message type.

15. The network of claim 14 wherein the message type includes one of: email, Short Message Service (SMS), Multimedia Message Service (MMS), and Instant Messaging.

16. The network of claim 13 wherein:
the spam center identifies entities that handle electronic messages from a particular originating address/domain based on the spam reports, and selectively distributes the new spam rules to the identified entities based on the originating address/domain.

17. The network of claim 13 wherein:
the identified one or more entities that receive the new spam rules comprise message centers in the network that handle electronic messages.

* * * * *